(12) United States Patent
Lin

(10) Patent No.: US 8,453,545 B2
(45) Date of Patent: Jun. 4, 2013

(54) MACHINE TOOL AND MACHINING METHOD THEREOF

(75) Inventor: Yu-An Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 342 days.

(21) Appl. No.: 12/915,064

(22) Filed: Oct. 29, 2010

(65) Prior Publication Data

US 2011/0154962 A1 Jun. 30, 2011

(30) Foreign Application Priority Data

Dec. 29, 2009 (TW) ................................ 98145415 A

(51) Int. Cl.
*B23Q 39/00* (2006.01)
*G05B 19/18* (2006.01)

(52) U.S. Cl.
USPC ................................ 82/1.11; 82/118; 82/124

(58) Field of Classification Search
USPC .................. 82/1.11, 117, 118, 124, 127, 129, 82/137; 29/36
See application file for complete search history.

(56) References Cited

U.S. PATENT DOCUMENTS

| | | | | | |
|---|---|---|---|---|---|
| 4,831,906 | A | * | 5/1989 | Sugimoto et al. | 82/118 |
| 5,029,499 | A | * | 7/1991 | Okitsu | 82/1.11 |
| 5,655,423 | A | * | 8/1997 | Nishio et al. | 82/1.11 |
| 5,842,393 | A | * | 12/1998 | Nagel | 82/129 |

* cited by examiner

*Primary Examiner* — Will Fridie, Jr.
(74) *Attorney, Agent, or Firm* — Altis Law Group, Inc.

(57) ABSTRACT

A machine tool includes a bed, a main spindle, a first tool rest, a first tool, a first driving mechanism, a second tool rest, a second tool, a second driving mechanism and a control device. The main spindle is located over the bed. The first tool is mounted on the first tool rest. The second tool is mounted on the second tool rest. The control device controls the first driving mechanism and the second driving mechanism to drive the first tool rest and the second tool rest, respectively, such that the first tool and the second tool move along the same direction, and machine a processing surface of a workpiece in order.

2 Claims, 5 Drawing Sheets

MACHINE TOOL AND MACHINING METHOD THEREOF

BACKGROUND

1. Technical Field

The present disclosure relates to machine tools, and particularly, to a machine tool having two tools and a machining method utilizing the machine tool thereof.

2. Description of the Related Art

A commonly used machine tool includes a tool rest, a first tool, and a second tool mounted on the tool rest. The first tool performs rough machining. The second tool performs finish machining. A machining method using the machine tool includes a rough machining step and a finish machining step. In the rough machining step, the tool rest is moved towards the workpiece until a processing surface of the workpiece is contacted. The first tool is tested to set a reference point, and started to perform rough machining. In the finish machining step, the tool rest is moved towards the workpiece until the processing surface of the workpiece is again contacted. The second tool is tested to set a reference point, as in the rough machining step. When, however, the process is again implemented for a subsequent workpiece, the reference points for both tools must be set again, thereby lowering efficiency of the process.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
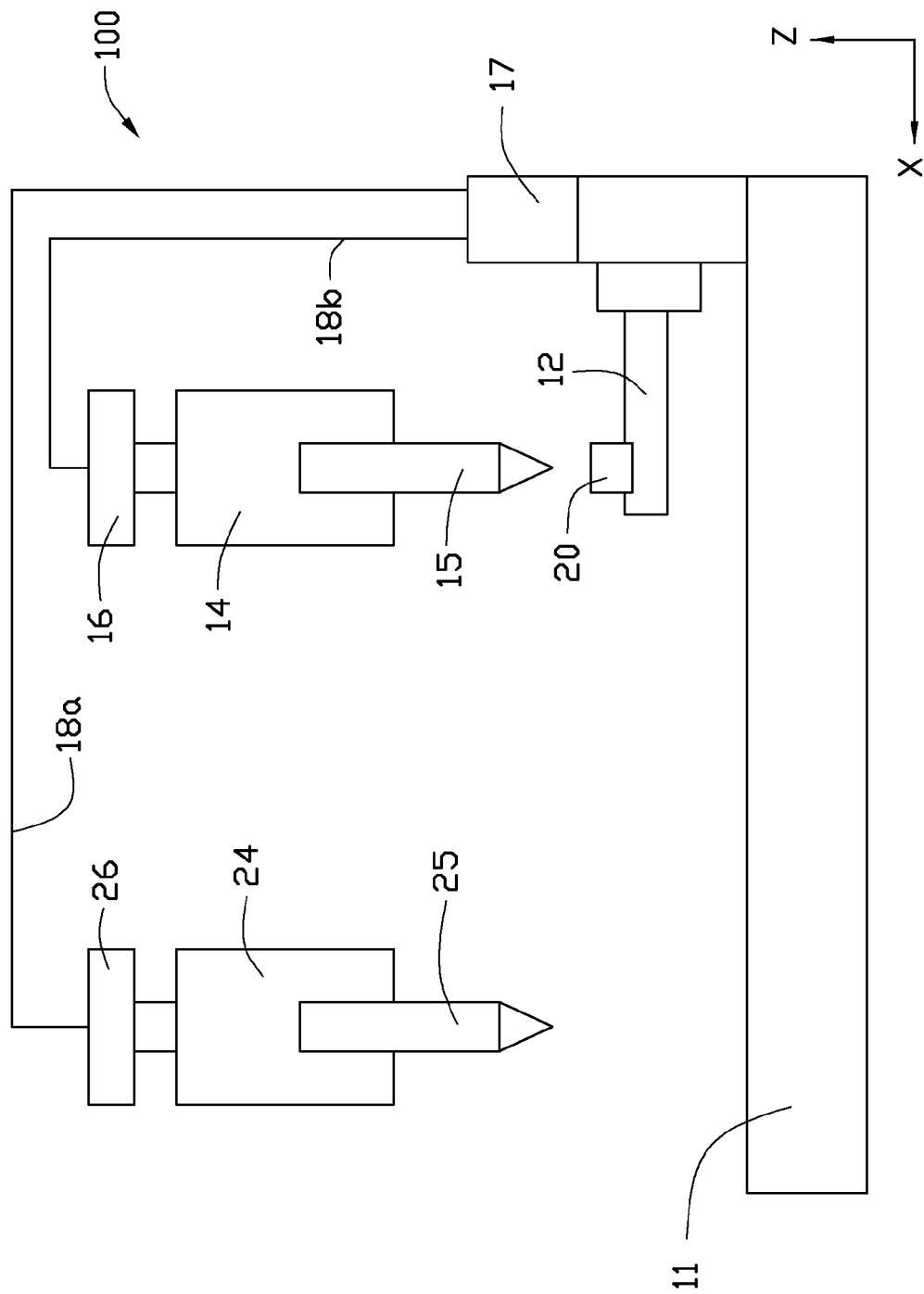
FIG. 1 is a planar view of one embodiment of a machine tool including a first tool and second tool.

Referring to FIG. 1, one embodiment of a machine tool 100 includes a bed 11, a main spindle 12, a first tool rest 14, a first tool 15, a first driving mechanism 16, a control device 17, a second tool rest 24, a second tool 25 and a second driving mechanism 26. The first tool 15 is mounted on the first tool rest 14. The first driving mechanism 16 moves the first tool rest 14, and is electrically connected to the control device 17 via a cable 18b. The second tool 25 is mounted on the second tool rest 24. The second driving mechanism 26 moves the second tool rest 24, and is electrically connected to the control device 17 via a cable 18a. In the illustrated embodiment, the machine tool 100 is a lathe. The first tool rest 14 is parallel to the second tool rest 24. The first tool 15 and the second tool 25 both move along a Z axis. The first tool 15 performs rough machining. The second tool 25 performs finish machining.

The main spindle 12 is capable of moving along the X axis. A first workpiece 20 is clasped on the main spindle 12, such that the first workpiece 20 is moved along an X axis under the first tool 15 or the second tool 25.

The first driving mechanism 16 moves the first tool rest 14 along the Z axis, and includes a first servo motor (not shown) providing power to the first tool rest 14. The second driving mechanism 26 moves the second tool rest 24 along the Z axis, and includes a second servo motor (not shown) providing power to the second tool rest 24.

Figure 2:
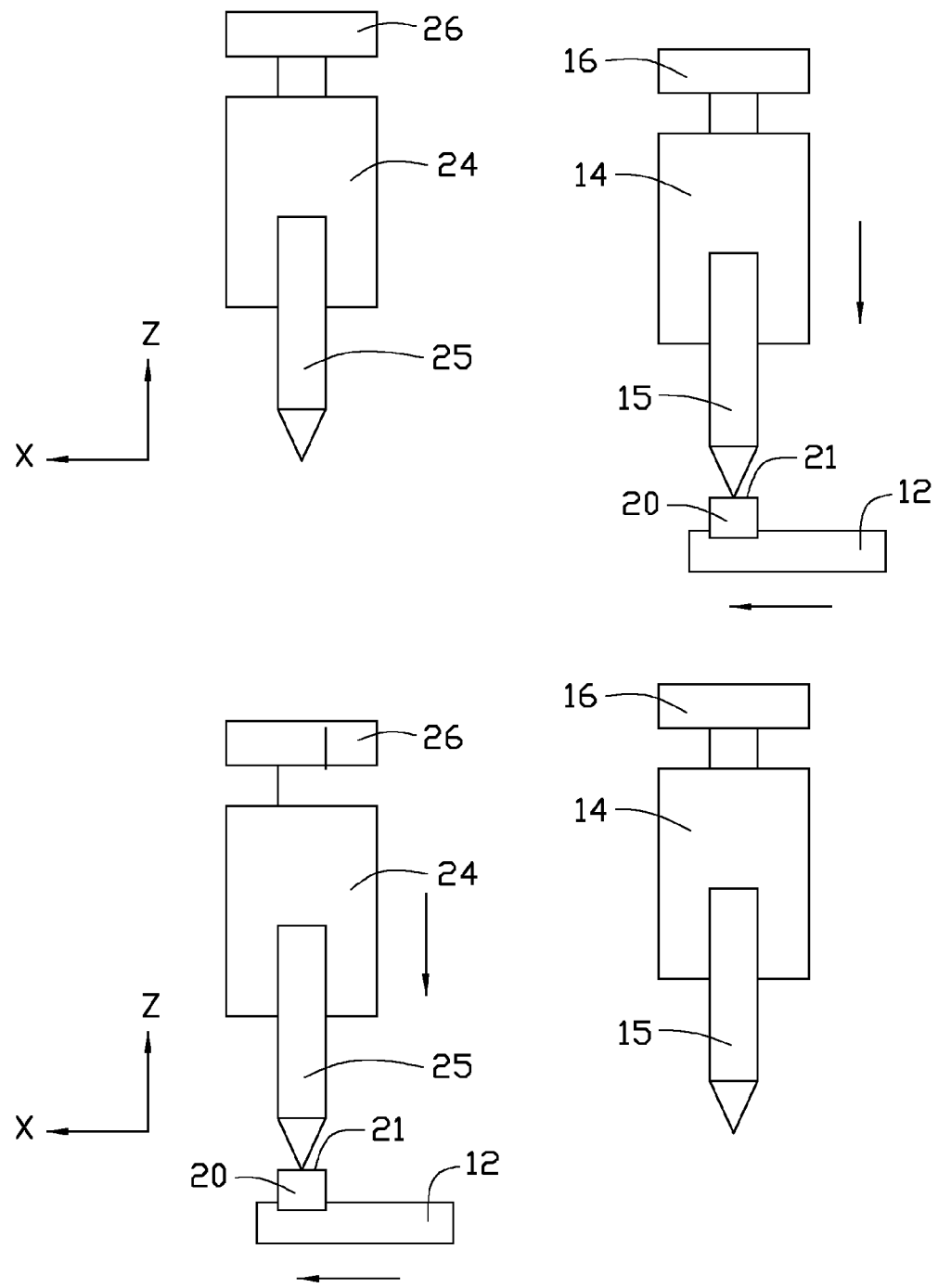
FIG. 2 is a planar view of the first tool and the second tool setting a reference point of the machine tool shown in FIG. 1, respectively.
Figure 3:
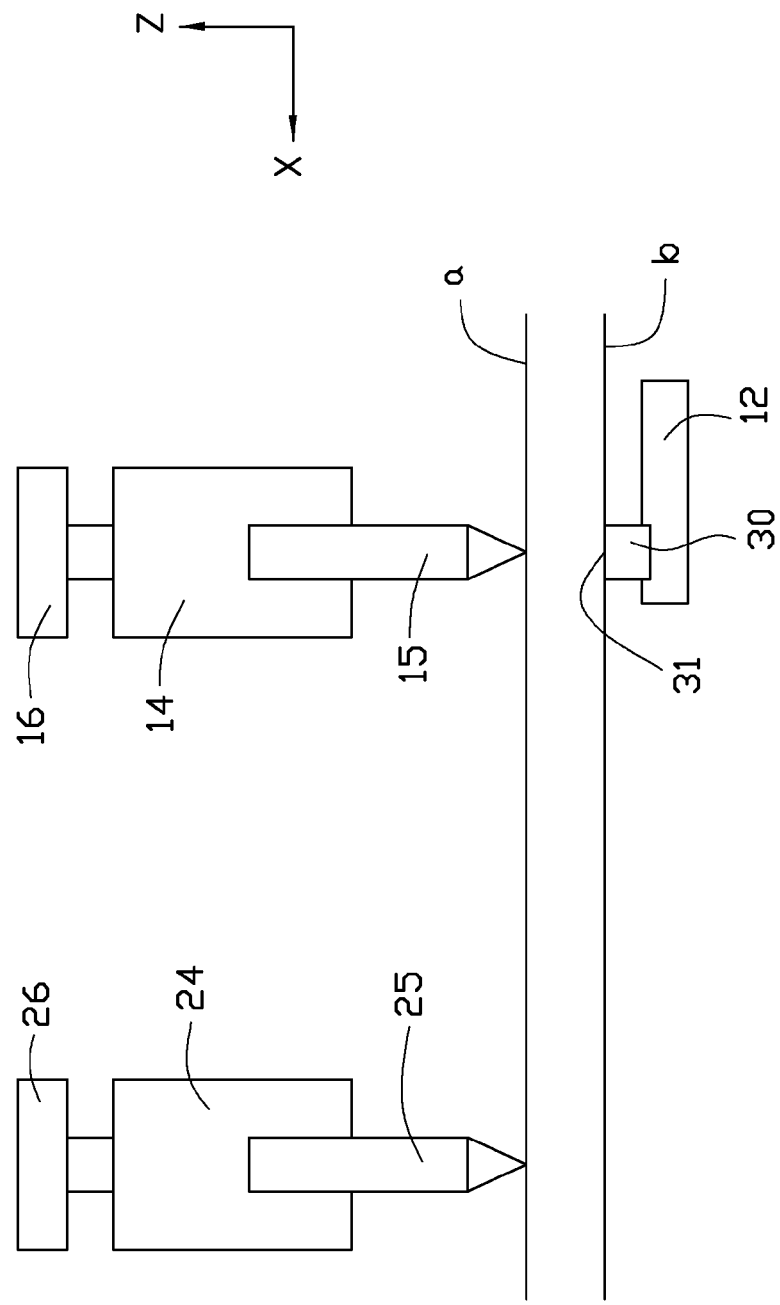
FIG. 3 is a planar view of a machining state of the first tool and the second tool shown in FIG. 1.

Referring to FIGS. 2 and 3, the control device 17 executes a first driving configuration, in which the first driving mechanism 16 or the second driving mechanism 26 is individually driven, such that the first tool rest 16 or the second tool rest 24 is moved along the Z axis, or a second driving configuration, in which the first driving mechanism 16 and the second driving mechanism 26 are driven simultaneously, such that both the first tool rest 16 and the second tool rest 26 are moved along the Z axis.

Figure 4A:
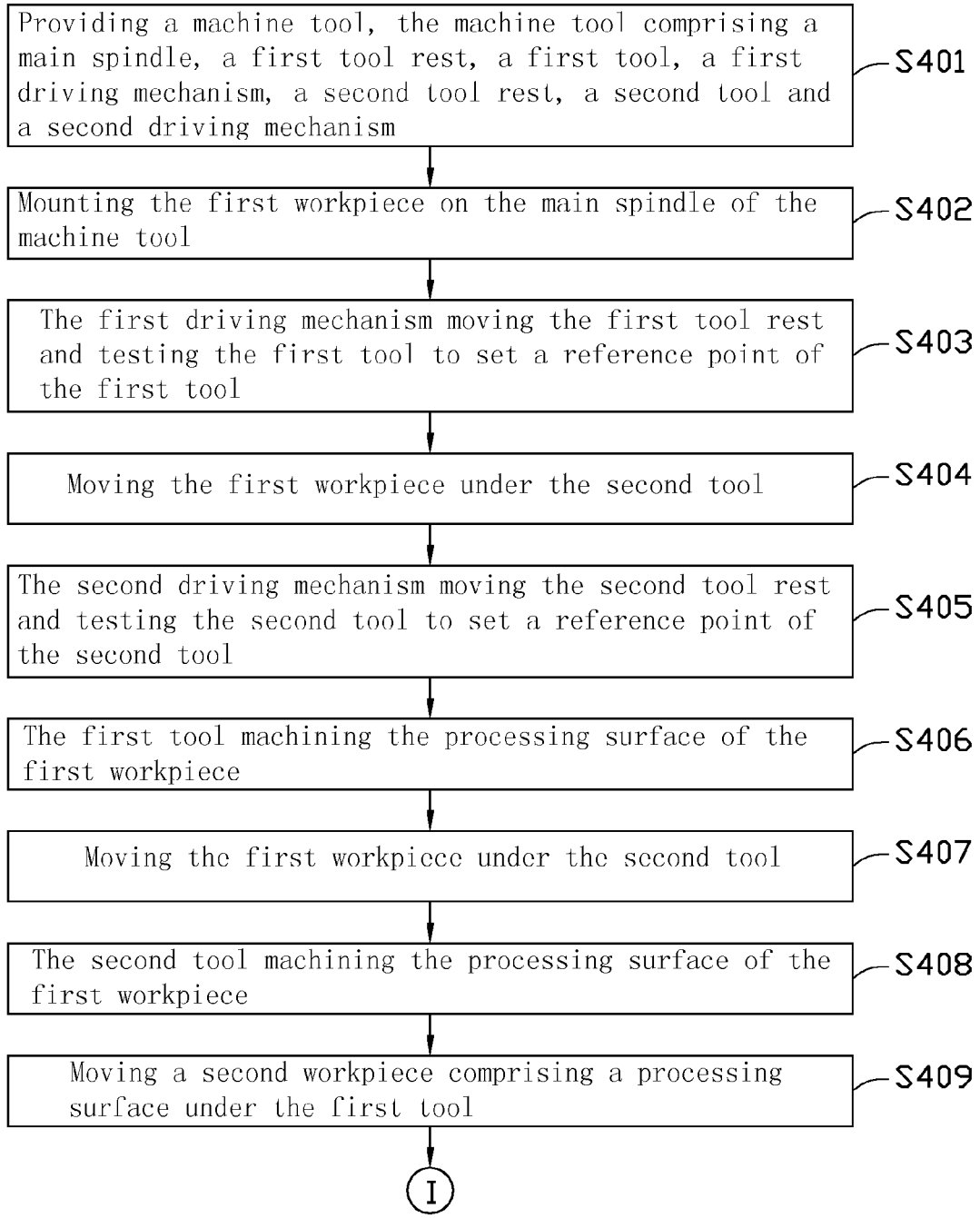
FIG. 4 is a flowchart of a machining method used by a machine tool such as, for example, that of FIG. 1.
Figure 4B:
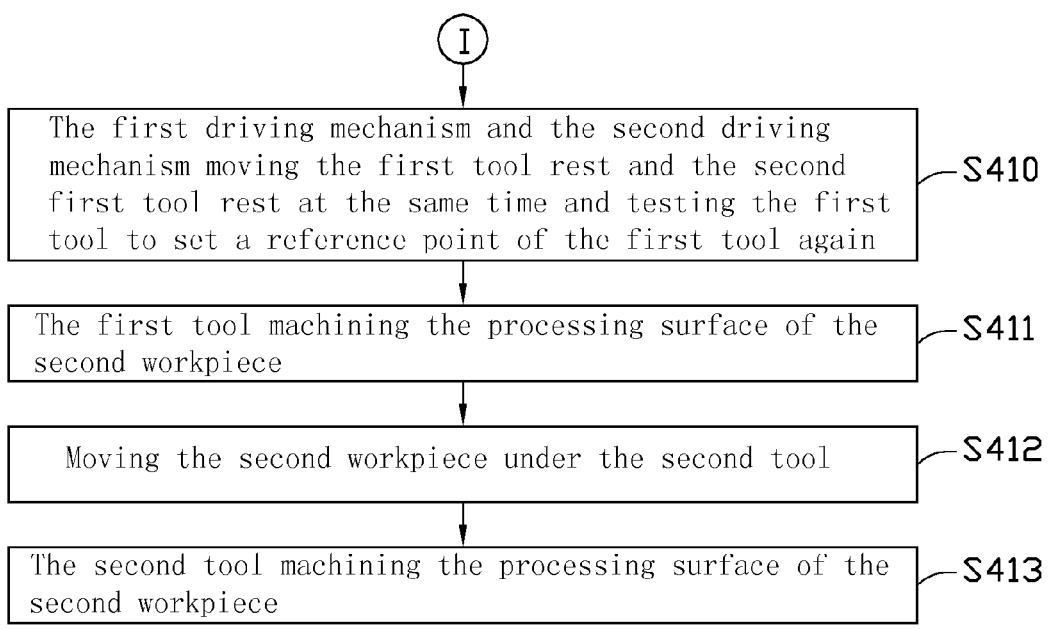

Referring to FIG. 4, a first workpiece 20 is machined according to an embodiment of a machining method as disclosed, as follows.

In step S401, a machine tool 100 is provided.

In step S402, a first workpiece 20 is mounted on a main spindle 12 of the machine tool 100. In one embodiment, the first workpiece 20 is a die core including a processing surface 21. The first workpiece 20 is rotated around the main spindle 12 or moved along an X axis by the main spindle 12.

In step S403, a control device 17 controls the first driving mechanism 16 in a first driving configuration. The first tool 15 is tested to set a reference point.

In step 404, a point of the first tool 15 contacts the processing surface 21 of the first workpiece 20 to test the first tool 15. The first workpiece 20 is moved under the second tool 25 by the main spindle 12. The control device 17 controls the second driving mechanism 26 in a first driving configuration.

In step 405, the second tool 25 is tested to set a reference point of the second tool 25. A point of the second tool 25 contacts the processing surface 21 of the first workpiece 20.

In step 406, the first driving mechanism 16 drives the first tool 15 to rough machine the processing surface 21 of the first workpiece 20.

In step 407, the first workpiece 20 is moved under the second tool 25 by the main spindle 12.

In step 408, the second driving mechanism 26 drives the second tool 25 to finish machine the processing surface 21 of the first workpiece 20. Before the processing surface 21 of the first workpiece20 has been finish machined, the second tool 25 does not set a reference point again, thereby increasing machining efficiency of the process.

In step 409, a second workpiece 30 is machined by the machine tool 100 after the first workpiece 20 has been machined.

In step 410, the control device 17 controls the first driving mechanism 16 and the second driving mechanism 26 by the second driving configuration. The first tool 15 and the second tool 25 are moved from a position a to a position b at the same time. When the first tool 15 is at the position b and contacts the processing surface 31 of the second workpiece 30, the position b is a reference point of the first tool 15. The first tool 15 and the second tool 25 are moved at the same time, with a distance therebetween being a constant, such that the reference point of the second tool 25 requires no resetting, whereby the machining efficiency of the machine tool 100 is increased.

In step 411, when the reference point of the first tool 15 is set, the first driving mechanism 16 drives the first tool 15 to rough machine the processing surface 31.

In step 412, the second workpiece 30 is moved under the second tool 25 by the main spindle 12.

In step 413, the second driving mechanism 26 drives the second tool 25 to finish machining the processing surface 31 of the second workpiece 30.

It is to be understood that the first tool 15 and the second tool 25 are not limited to providing rough machining and finish machining, and can alternatively execute other machining processes such as drilling.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A machining method comprising:
providing a machine tool, the machine tool comprising a bed, a main spindle located over the bed, a first tool rest, a first tool mounted on the first tool rest, a first driving mechanism moving the first tool rest, a second tool rest, a second tool mounted on the second tool rest, a second driving mechanism moving the second tool rest and a control device, such that the first tool and the second tool move along the same direction, and machine a processing surface of a first workpiece in order;
mounting the first workpiece on the main spindle of the machine tool;
moving the first tool rest by the first driving mechanism and testing the first tool to set a reference point of the first tool;
moving the first workpiece under the second tool;
moving the second tool rest by the second driving mechanism and testing the second tool to set a reference point of the second tool;
machining the processing surface of the first workpiece by the first tool;
moving the first workpiece under the second tool;
machining the processing surface of the first workpiece by the second tool;
moving a second workpiece under the first tool, wherein the second workpiece comprising a processing surface;
moving the first tool rest and the second tool rest at the same time by the first driving mechanism and the second driving mechanism and setting a second reference point of the first tool;
machining the processing surface of the second workpiece by the first tool;
moving the second workpiece under the second tool; and
machining the processing surface of the second workpiece by the second tool.

2. The machining method of claim 1, wherein the first workpiece is rough machined by the first tool and finish machined by the second tool.

* * * * *